United States Patent [19]

Morse

[11] Patent Number: 4,716,262
[45] Date of Patent: Dec. 29, 1987

[54] VANDAL-RESISTANT TELEPHONE KEYPAD SWITCH

[75] Inventor: Milton Morse, Fort Lee, N.J.

[73] Assignee: Nena Morse, Fort Lee, N.J.

[21] Appl. No.: 801,136

[22] Filed: Nov. 22, 1985

Related U.S. Application Data

[63] Continuation-in-part of Ser. No. 544,391, Oct. 21, 1983, Pat. No. 4,555,600, and a continuation-in-part of Ser. No. 381,905, May 25, 1982, Pat. No. 4,501,936, and a continuation-in-part of Ser. No. 299,509, Sep. 4, 1981, Pat. No. 4,436,965, and a continuation-in-part of Ser. No. 286,063, Jul. 23, 1981, abandoned, and a continuation-in-part of Ser. No. 261,647, May 7, 1981, abandoned, and a continuation-in-part of Ser. No. 236,757, Feb. 23, 1981, Pat. No. 4,438,300.

[51] Int. Cl.$^4$ ............................................. H01H 13/70
[52] U.S. Cl. .................. 200/5 A; 200/159 B; 200/302.1; 200/306
[58] Field of Search ................ 200/5 A, 86 R, 159 A, 200/302.1, 302.2, 306, 340; 179/90 K, 184, 178

[56] References Cited

U.S. PATENT DOCUMENTS

| | | | |
|---|---|---|---|
| 3,699,294 | 10/1972 | Sudduth | 200/86 R |
| 3,932,722 | 1/1976 | Ohata et al. | 200/302.2 X |
| 3,995,126 | 11/1976 | Larson | 200/5 A |
| 4,046,975 | 9/1977 | Seeger, Jr. | 200/306 X |
| 4,066,851 | 1/1978 | White et al. | 200/306 X |
| 4,217,473 | 8/1980 | Parkinson | 200/5 A |
| 4,291,201 | 9/1981 | Johnson et al. | 179/90 K |
| 4,386,245 | 5/1983 | Nimura et al. | 200/5 R |
| 4,440,990 | 4/1984 | Nozaki | 200/5 A |
| 4,490,587 | 12/1984 | Miller et al. | 200/5 A |
| 4,499,343 | 2/1985 | Prioux et al. | 200/5 A |
| 4,500,758 | 2/1985 | Guckenheimer | 200/5 A |
| 4,531,033 | 7/1985 | Schmid et al. | 200/314 |
| 4,532,575 | 7/1985 | Suwa | 200/5 A |
| 4,540,865 | 9/1985 | Calder | 200/5 A X |
| 4,555,600 | 11/1985 | Morse | 179/178 |
| 4,570,039 | 2/1986 | Osawa et al. | 200/5 A |
| 4,580,018 | 4/1986 | Yoshihara | 200/5 A |

FOREIGN PATENT DOCUMENTS 1375333 11/1974 United Kingdom .

Primary Examiner—J. R. Scott
Attorney, Agent, or Firm—Edward R. Weingram

[57] ABSTRACT

A shielded electrical switch includes a pressure-actuated switch comprised of three layers, the top and bottom layer of which are electrically-conductive and the intermediate layer of which is a spacer layer containing apertures at the switch points. A sealing membrane is coupled over the layered switch, the membrane having thickened push-button supports overlying the switch points. The thickened push-button supports are spaced from the membrane via frustro-conical mounting portions on the membrane. This frustro-conical mounting gives the buttons the sufficient "feel" or resistance when depressed, and also insures that the switch-actuating portions of the membrane will make contact with the upper surface of the switch to insure that the switch points of the upper and lower layers of the switch will make contact via the intermediate layer. The membrane and the sealed, layered switch are, in turn, enclosed in an armored, sealed push-button enclosure. The entire assembly is thus a highly vandal-resistant, low-cost, push-button switch.

15 Claims, 10 Drawing Figures

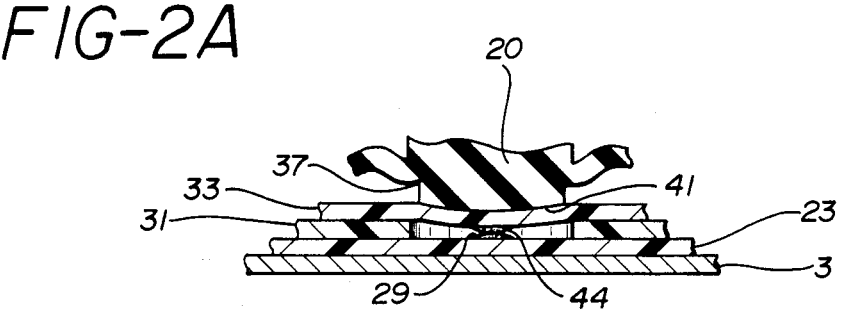
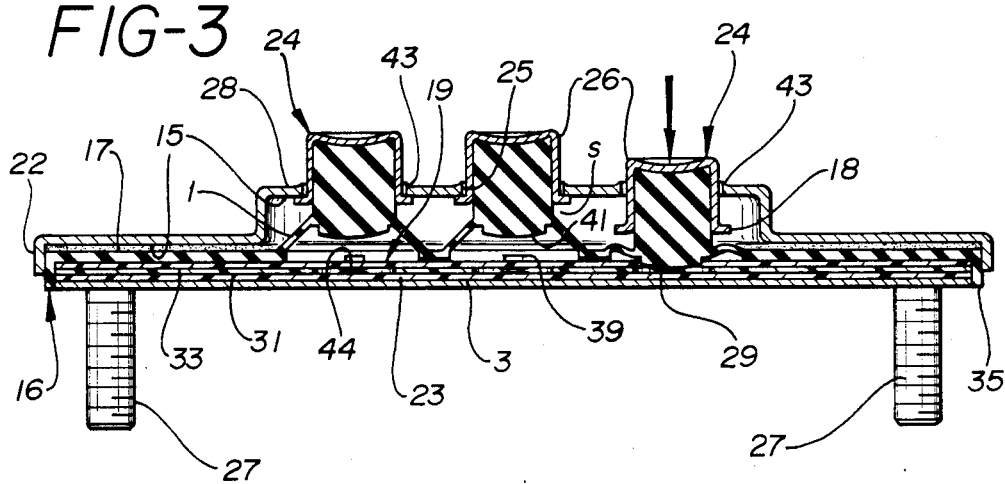

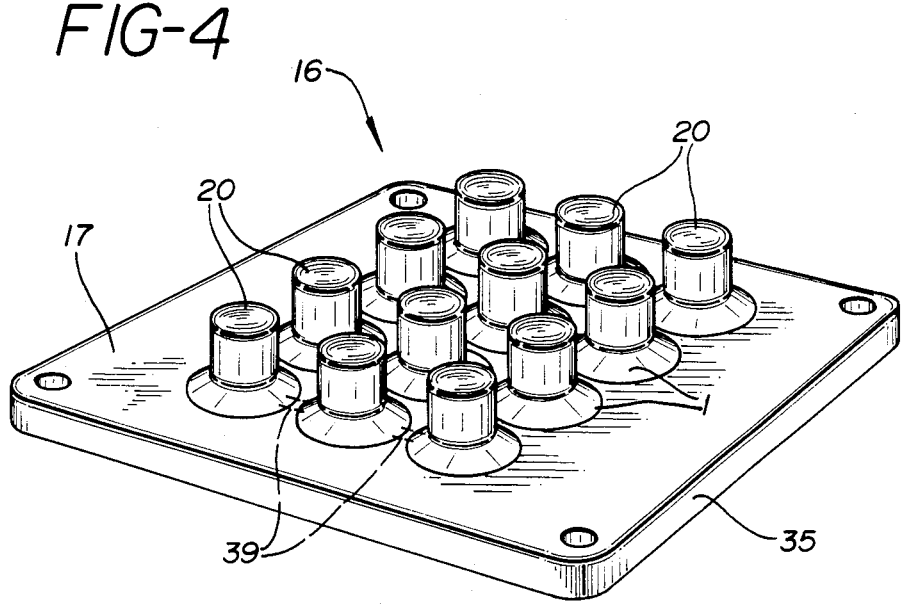
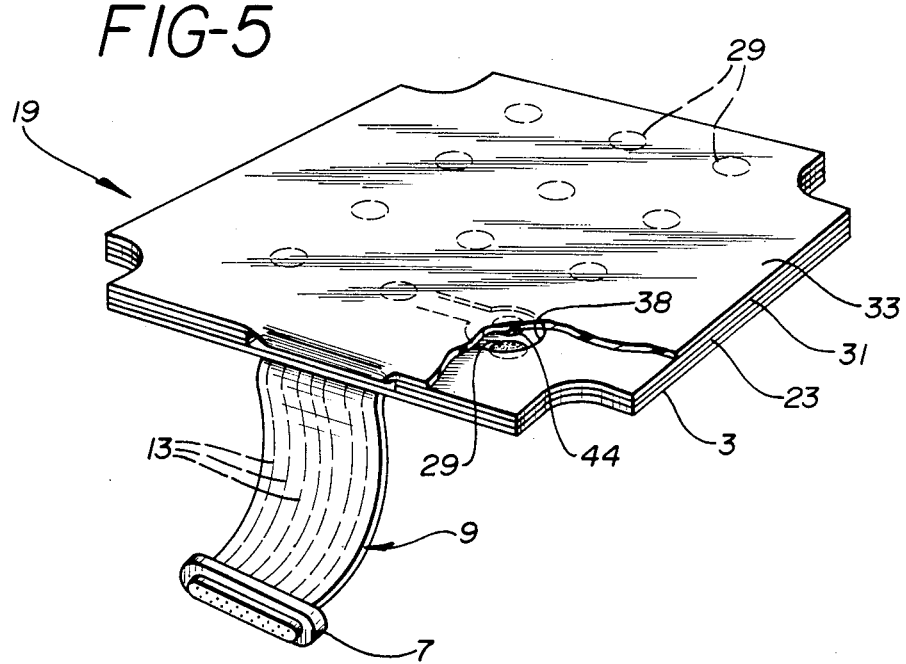

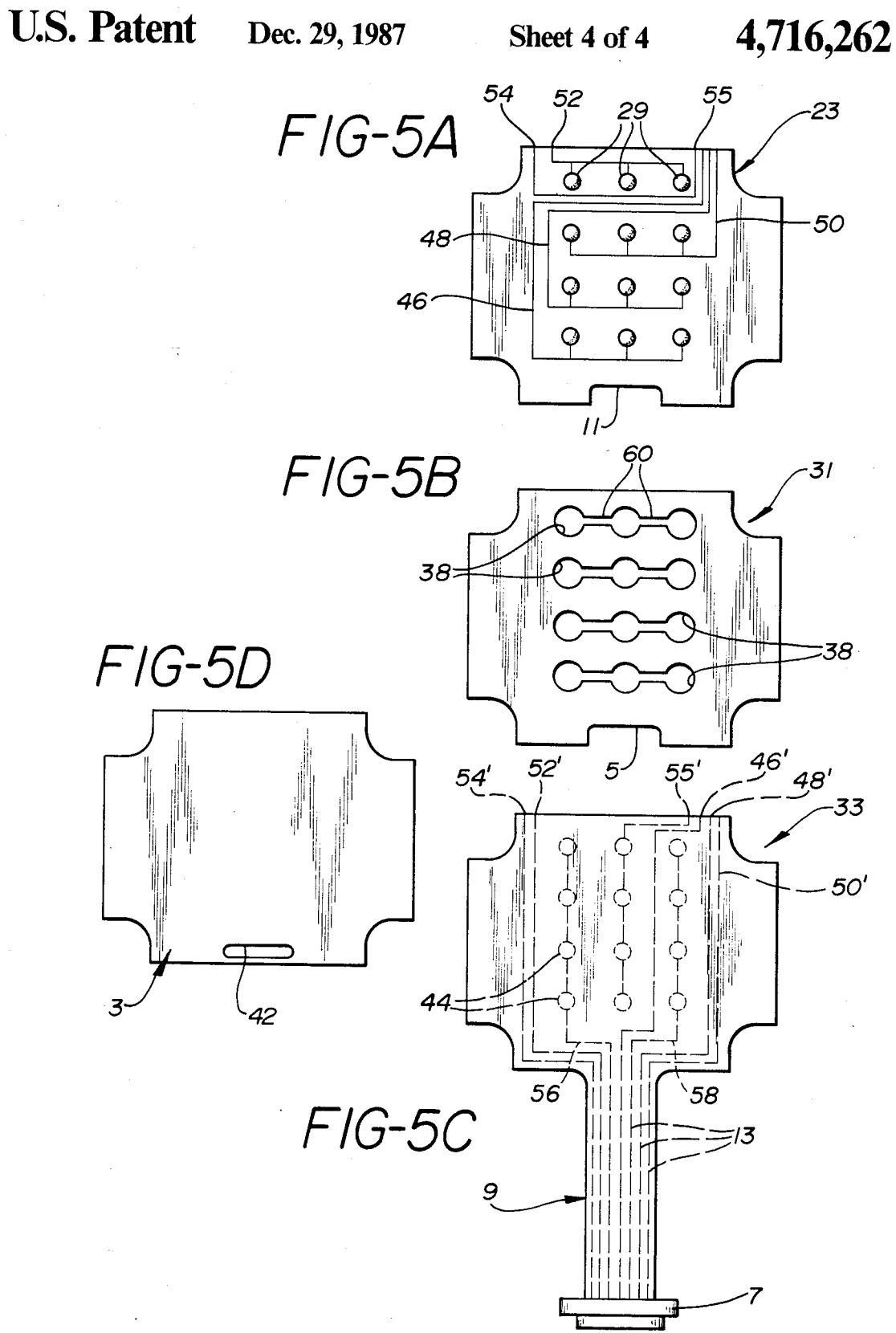

VANDAL-RESISTANT TELEPHONE KEYPAD SWITCH

CROSS-REFERENCE TO RELATED APPLICATIONS

This application is a continuation-in-part of application Ser. No. 544,391, filed Oct. 21, 1983, now U.S. Pat. No. 4,555,600, and a continuation-in-part of application Ser. No. 381,905, filed May 25, 1982, now U.S. Pat. No. 4,501,936, and a continuation-in-part of application Ser. No. 299,509, filed Sept. 4, 1981, now U.S. Pat. No. 4,436,965, and a continuation-in-part of application Ser. No. 286,063, filed July 23, 1981, now abondoned, and a continuation-in-part of application Ser. No. 261,647, filed May 7, 1981, now abondoned, and continuation-in-part of application Ser. No. 236,757, filed Feb. 23, 1981, now U.S. Pat. No. 4,438,300.

FIELD OF THE INVENTION

The present invention relates to a shielded keypad switch. More specifically, this invention concerns a vandal-resistant shielded switch used as a telephone keypad, especially of the type associated with a push-button coin-operated telephone set.

BACKGROUND OF THE INVENTION

Within recent years, telephone sets incorporating push-button arrays, commonly including twelve such push-buttons, have come into widespread use and have largely supplanted the previously common rotary dial-type telephone. The individual push-buttons comprising such a telephone set array normally project through the cover of the telephone, or a portion of the telephone cover. The remainder of the switching array is contained beneath this outer shell of the telephone set. Such telephone sets are also employed in coin-operated pay stations which are generally located in high volume traffic areas where they are subject to damage from environmental hazards, including especially dust, sugar containing liquids, and the like which can readily seep through the openings surrounding the individual push-button keys and cause damage, in some cases irreparable damage, to the underlying switching device. In such installations, there is also a great likelihood of damage resulting from vandalism, and a protected push-button switch which is permanently attached, and not easily removed, and yet allowing effective operation of the telephone is very desirable.

Several types of covering elements have been previously proposed for use in connection with push-button type telephones, but these have not fully addressed the foregoing problems of providing a protected push-button array to prevent damage. For example, patents such as U.S. Pat. Nos. 3,739,105; 3,927,282; 4,002,855; and 3,345,769, have been concerned with a variety of problems including arrangement for facilitating actuation of the buttons by varying spacing of the actuating means for the individual push-buttons, or in the case of the U.S. Pat. No. 3,345,769 patent, providing a means for supporting message pads or the like.

In certain of my aforementioned patents and applications, a protective covering device is disclosed which provides a flexible sheet or membrane that overlies the pushbuttons. In front of each key this membrane is formed with a thickened region or projection that itself normally bears indicia identifying the particular key. The membrane is continuous, so that it completely seals in the delicate underlying switches.

Such an arrangement has not, however, proven highly vandal resistant. The elastomeric sheet is normally adhesively bonded to the front face of the support plate so that it can be peeled off simply by starting at a corner and working across. This exposes the delicate underlying push-button mechanism, and makes the phone a likely candidate for vandalizing and destruction by the elements.

Another problem with this known arrangement is that the buttons can wear and become illegible. They are mainly made of the same relatively soft material as the seal membrane, so that normal use alone is capable of wearing them down.

The above problems are solved with the invention described in my application Ser. No. 544,391 U.S. Pat. No. 4,555,600, where a standard keypad was used that comprises a rigid support plate having a front face and formed with an array of throughgoing apertures with respective telephone push-buttons projecting at the apertures through the plate past the front face thereof.

In accordance with that invention, an assembly was provided which includes a continuous flexible membrane which overlies the front face of the telephone support plate and is formed in front of each of the push-buttons with a relatively thick protruding tab portion. Thus, the membrane seals the apertures around the push-buttons while allowing the same to be depressed via the protruding tab portions of the membrane. Means such as the switches associated with the push-buttons urge the push-buttons and the overlying tab portions of the membrane forward from the front face.

The shield assembly of that invention further includes a rigid shield plate formed with an array of throughgoing apertures aligned with and generally identical to those of the support plate and having a rear face confronting the front face of the support plate and an opposite front face. The tab portions of the membrane project forward through the apertures of the shield plate past the front face thereof. The shield plate is itself secured in front of the membrane with the apertures aligned. Respective rigid caps fitted over the protruding tab portions project forward through the shield-plate apertures and each have an outwardly projecting flange extending generally parallel to and lying between the plates and of greater size than the respective shield-plate aperture. These flanges are urged forward against the rear face of the shield plate by the underlying protruding portions of the membrane, and in turn by the telephone push buttons.

In such an assembly the relatively delicate membrane is not exposed at all, while still effectively preventing any leakage around the push-buttons through the support plate, e.g. the telephone faceplate. Only the rigid caps and shield plate are exposed, and these elements can be quite rugged. The shield plate of this invention is typically made df steel, and the membrane is of an elastomeric material such is a silicone rubber. This combination of materials makes an extremely durable shield that seals very tightly.

In accordance with another feature of that invention the shield-plate apertures and caps are complementarily polygonal, normally square. The membrane is formed at each pushbutton with a respective protruding portion which has a height greater that that of the rigid cap which covers same and projects through the shield plate. This maintains the flange of the covers in good contact with the shield plate to provide a relatively close seal. Additionally the shield plate apertures are formed by being punched through from the underside of the plate, i.e. from the side which lies adjacent the membrane. This produces a shoulder or burr about the outwardly facing periphery of the apertures, making it difficult for a vandal to insert a pointed object into the space between the caps and the shield plate.

In addition, the height of the capped projections above the shield plate is designed to be less than the total available travel of the underlying telephone push-button which is moved by pressure on the capped projection. Accordingly, even when the distal end of the capped projection is flush with the outward face of the shield plate: the telephone push-button has not quite bottomed. This assures that a vandal will not damage the switching mechanism even by impacting the capped projections with a hammerlike object—notably the telephone receiver.

According to a further feature of that invention, the caps taper forward from the flanges and fit snugly within the respective shield-plate apertures when the respective flanges abut the rear face thereof. Thus the caps effectively seal the shield-plate apertures when in the fully out position.

The shield-plate of that invention has a backwardly turned outer peripheral rim. The membrane is recessed within this rim, making it virtually impossible to pry off the assembly according to the invention.

The keypad shield assembly further has means for securing the membrane and the shield plate to the front face of the support plate. This means can be a layer of adhesive on the back face of the membrane. It may also be constituted by a plurality of threaded studs projecting back from the back face of the shield-plate through the membrane and support plate.

The present invention utilizes some of the features described above and in my aforementioned U.S. Pat. No. 4,555,600, however, the present invention eliminates the need for the existing push-button, touch-tone, or pulse-tone switch arrangement in the telephone system and substitutes therefor a contact plate which acts as the electrical switch which responds to contact by the various push-buttons. The electrical contact switching plate has three soft layers mounted on a base layer which is a solid metallic surface. The first soft layer includes a first set of electrical leads and contact points. An intermediate spacing layer and a third top layer consisting of a second set of electrical leads and contact points overlie the first layer and the background. The leads are brought out for use via a ribbon cable formed integrally with the top layer.

As will be seen, the push-buttons now contact a surface of the top layer of the switch plate and cause the top layer to contact the bottom layer via the intermediate layer. An indication is developed when the contact is made amongst the layers of the switchplate.

The push-buttons of the invention described in the aforementioned U.S. Pat. No. 4,555,600 included a flexible membrane which overlaid the front face of the telephone support plate. The membrane contained protruding portions on which the push-buttons were mounted. Depressing a metallic cap mounted on that portion of the membrane caused the membrane to flex and thereby caused the corresponding underlying pushbutton of the telephone set to also depress. As taught in the U.S. Pat. No. 4,555,600, the "feel" and resilience of the push-buttons are, in part, developed by the pressure exerted by the buttons of the switch on the telephone set itself.

As the present invention eliminates the use of the telephone set push-buttons and substitutes therefore a mechanical switch matrix of a layered type, the push-buttons of the present invention still use a membrane mounted in a manner similar to that in the copending application. However, since the "feel" and/or resilience of the buttons can no longer utilize the forces exerted by the buttons of the telephone set, a modification to the membrane has been made to deliver the proper "feel" to the user of the push-button switch. Further, the membrane is designed such that the distance of travel of the push-button to contact the pressure actuated mechanical switch is limited to avoid damage to the switch as by permanent deformation therof. This resilience and control is achieved by having the protrusions of the membrane formed on a frustro-conical support base. This shape of base allows for an initial high resistance to the touch and then lower resistance to insure that good contact is made by the protrustion with the pressure-actuated switch.

DESCRIPTION OF THE DRAWINGS

The above and other features and advantages will become more readily apparent from the following, reference being made to the accompanying drawing in which:

FIG. 2A is an enlarged section of the switch contacts of a depressed button;

FIG. 3 is a further large-scale section of the shielded switch assembly of this invention, the view being taken along the line 3—3 of FIG. 1;

FIG. 4 is a perspective view of the membrane assembly of FIGS. 2-3;

FIG. 5 is a perspective view partially in section of the electrical switch of the invention; and FIGS. 5A-5D are plan views of each layer of the switch of FIG. 5.

SPECIFIC DESCRIPTION

Figure 1:
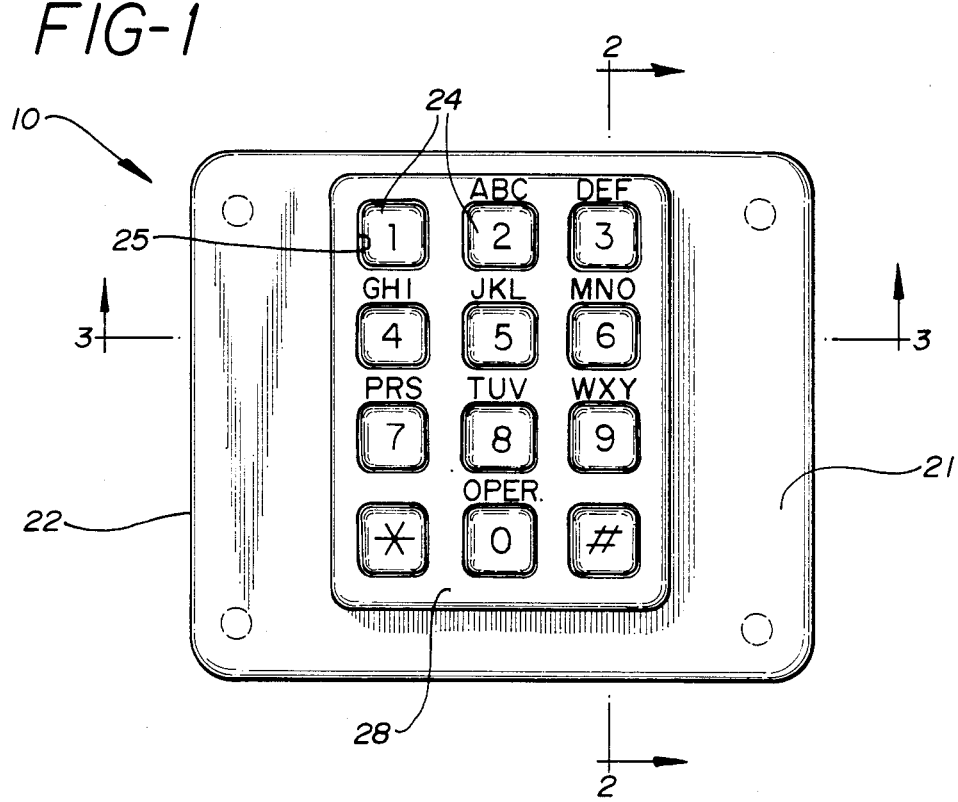
FIG. 1 is a front view of the shielded switch assembly according to the invention.
Figure 2:
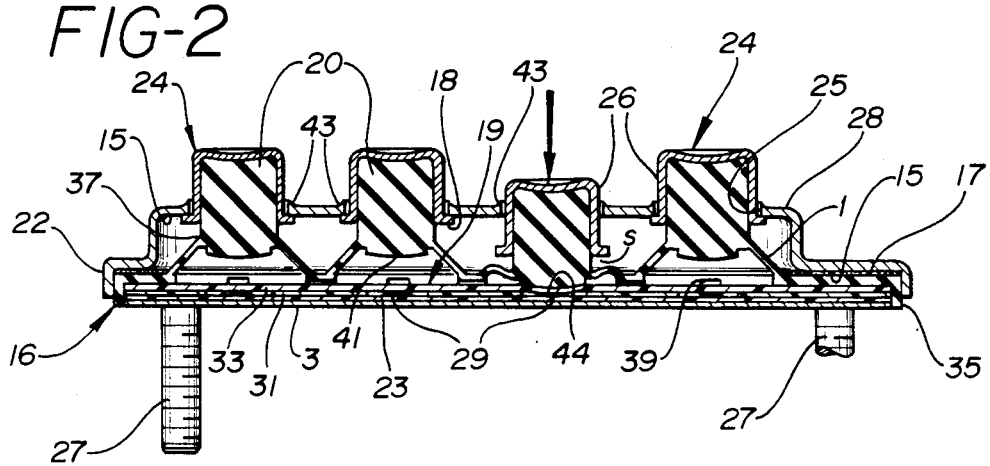
FIG. 2 is a large-scale section taken along line 2—2 of FIG. 1, showing the switch assembly of this invention.

As seen especially in FIGS. 1-3, a keypad shielded switch assembly 10 according to the present invention has a rectangular metal plate 21, typically of stainless steel, that lies generally in and defines a plane. An annular centering rim 22 projects back from the plane at the outer periphery of the plate 21 and a central and rectangular raised portion 28 projects oppositely forward from the plane, offset toward what is normally the upper edge of the plate 21 to leave space for a phone-number legend. This raised portion 28 in turn is formed with a regular array of twelve generally square apertures 25 of the size and shape standard in a telephone, and with rounded corners.

A flexible silicone-rubber membrane 16 has a front face 17 lying against a back inner face 15 of the shield plate 21 and normally adhered thereto by a heavy-duty adhesive. The thickness of this membrane 16 plus that of any adhesive on it is about equal to the rearward projection of the rim 22 for completely enclosing the membrane when the assembly is mounted, as will be described below.

Membrane 16 is formed with a plurality of upwardly projecting or protruding button-like portions 20. These portions 20 directly overlie the contacts 29 of the underlying switch plate 19 when the assembly is mounted.

The mechanical force required to close switch plate contacts 29 needs to be accurately directed, therefore, as, best seen in FIGS. 2, 2A and 3, the underface 37 of each portion 20 preferably has a convex portion 41 which controls the force on the contacts 29, thus reducing the possibility of excessive wear of the silicone rubber portions 20.

The membrane 16 also has a pliable lip portion 35 formed therein about its periphery to support switch 19 snugly therein.

Fitted over each projecting portion 20 of membrane 16 is a respective key cap 24, made e.g. of 24-gauge stainless steel. Each cap 24 is of prismatic cup shape and has an annular side wall or skirt 26 terminating at an outwardly turned flange or rim 18. These side walls 26 flare slightly backward, that is they are inclined at an angle of several degrees to the vertical axis of cap 24, and can fit snugly and complementarily within the respective apertures 25 with the flanges 18 lying flat against the inner face 15 of the plate 21 at the raised portion 28. The projections 20 fit snugly within the backs of the square caps 24 and the membrane 16 is molded such that the caps 24 are urged into their outer positions shown in FIGS. 2-3 for all but the "6" key.

In addition, each cap 24 is axially internally slightly shorter than the height of the respective projection 20 above the membrane 16, leaving a space "s". This maintains the flange of the covers in good contact with the shield plate to provide a relatively good seal. Additionally, the shield plate apertures are formed by being punched through from the underside of the plate, i.e. from the side which lies adjacent the membrane. This produces a shoulder or burr 43 about the outwardly facing periphery of the apertures, making it extremely difficult for a vandal to insert a pointed object into the space between the caps and the plate.

In addition, the height of the capped projections above the shield plate is designed to be less than the total available travel of the underlying telephone push button, which is moved by pressure on the capped projection. Accordingly, even when the distal end of the capped projection is flush with the outward face of the shield plate, the telephone push-button has not quite bottomed. This assures that a vandal will not damage the switching mechanism even by impacting the capped projections with a flat, hard object—notably the telephone receiver. The face of each cap 24 is downwardly dished to provide a kinesthetic feel which enables the user to discern when the finger is centered on the button and to center each cap on the respective projection 20, whose front end face is complementarily concave.

Each cap 24 bears appropriate indicia, here that of a push-type telephone pad, although of course the instant invention could equally well be used for any other type of heavy-duty keypad, such as provided on a self-service gasoline pump. The indicia can be stamped in and filled with a phosphorous-base ink that glows in the dark.

Normally the assembly of this invention is available in stick-on and in bolt-on models, although it is of course possible to use both fastenings at the same time.

The bolt-on embodiment of the invention is shown in FIGS. 2-3 where bolts 27 (spot-welded to the plate) are seen projecting from plate 21. These serve to secure the assembly. These bolts also go through membrane 16.

As shown in FIG. 4, membrane 16 has a lip 35 formed about its periphery. This lip creates a rim on the surface of the membrane opposite that which contacts plate 21. The surface and the walls of the lip seal and support switch assembly 19 therein. The elements 20 which support the push-buttons and which are the switch contacts are mounted on conical support portions 1 of the membrane. These are frustro-conical portions, and as shown in FIGS. 2 and 3, are kinesthetic break points which require an initial force to overcome the resistance of the walls of the cone and, subsequently, less force as the resistance is overcome so that both good contact is made by the interior convex surfaces 41 of elements 20 with contacts 29 on the switch assembly 19 and, the switch gives the proper "feel" to the user.

Air passages 39 are provided between each and every conical support 1 so that air cannot be trapped in any of the cones and inhibit operation of the device.

FIGS. 5-5D show the pressure-sensitive switch of the invention. With reference to FIGS. 5-5D, the switch is seen to comprise a base layer 3 formed of solid material such as metal. The base layer 3 serves to support three layers of flexible material which form the switching mechanism. Base layer 3 has an aperture 42 formed therein which, as will be seen, acts as a support for an electrical ribbon cable 9 and an electrical connector 7.

The switch mechanism consists of three layers of flexible material such as MYLAR. A base layer 23 is shown in FIG. 5A and has twelve switch contacts 29 formed thereon of electrically conductive material. In addition to switch contacts 29, electrical conductors 46, 48, 50 and 52 from each of the four groups of three switch contacts are laid out along the base layer 23 connecting each group to corresponding conductors on top layer 33 and then to connector 7. A notch 11 is cut in base layer 23 so as to interfit with aperture 42 in the support 3 again to channel and control ribbon cable 9.

FIG. 5B shows intermediate layer 31. The intermediate layer is formed of MYLAR and has four series of three apertures 38 formed therein. Each of the series of apertures overlies respective ones of the switch contacts 29 in base layer 23. The apertures are connected to each other via spacing channels 60 in each of the groups of three to again prevent air pressure from building up in any one of the switch points or the channels so as to inhibit operation. A notch 5 is formed in intermediate layer 31 which interfits over aperture 42 then beneath notch 11 to guide ribbon cable 9.

Top layer 33, FIG. 5C, has twelve switch contacts 44 formed thereon. Electrical leads are connected to these contacts so as to connect the contacts to the conductors generally shown as 13 on ribbon cable 9. These conductors are in turn electrically coupled to electrical connector 7 to connect the switch to the remaining circuitry of the telephone. Cable 9 is formed integrally with and of the same material as the top layer 33 of the pressure-actuated switch. In practice, the electrical conductors are laid out on both the top and bottom layer, 33 and 23, as a unit and these two layers are then folded over the intermediate layer 31.

This is illustrated in FIGS. 5A and 5C. In FIG. 5A, electrical conductors 46, 48, 50 and 52 are formed on the MYLAR layer 23. Each conductor connects a group of three electrical contacts 29 to the ribbon cable 9 and to the electrical connector 7. Conductor 54-55 is also shown formed on layer 23. This conductor is simply laid out on the layer for convenience as will be explained in connection with FIG. 5C.

In FIG. 5C the corresponding portions of conductors 46, 48, 50, 52, 54 and 55 are designed by numerals 46', 48', 50', 52', 54' and 55'. Thus, in practice, the conductor designated by numeral 54 and 54' is a single conductor joined at a fold in the MYLAR layers 23 and 33. Similarly, numerals 46, 48, 50, 52 and 55 on layer 23 (FIG. 5A) are connected to conductors 46', 48', 50', 52' and 55' on layer 33 (FIG. 5C). Note that the conductors are formed on top layer 23 (FIG. 5A) connecting four groups each consisting of three contacts, while on bottom layer 33, three groups of contacts each consisting of four contacts are connected together. This configuration comports to the connections required in a telephone set. It should be clear, however, that any other configuration of contacts and connections can be used on the switch assembly of FIGS. 5A–5C.

As can now be seen, the conductor 54, 55 on top layer 23 connects the center group of four contacts on bottom layer 33 to the cable via conductor 54', 55'. The left-hand group of four contacts 33 is directly connected to the cable 9 and to the connector 7 via conductor 56, while the right-hand group is so connected via conductor 58. Thus, seven conductors 46', 48', 50', 52', 54', 56 and 58 appear on cable 9.

The three layers of the pressure-sensitive switch are adhered together via suitable adhesive. The entire switch arrangement is then adhesively placed on the metal backing plate 3 (FIG. 5D). Electrical connector 7 is added as a final step. The electrical conductors are formed on the soft MYLAR plastic surface via the silk screening printing process. In the preferred embodiment, the material forming the electrical conductors is a silver solution.

The arrangement of this invention, therefore, presents nothing but metallic surfaces to the exterior, making it extremely rugged and virtually impossible to permanently mark or scratch. The numerals stamped directly in the key caps can be expected to last a long time, even in heavy service. At the same time, the assembly is wholly watertight so that it will remain dry and otherwise protected from the elements.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:

1. A switch assembly comprising:
    a pressure-actuated switch including a rigid support plate; a base layer of flexible material having a front face formed with an array of electrically-conductive paths thereon connected to said support plate;
    an intermediate layer formed on said base layer having apertures therethrough overlying portions of said electrically-conductive paths of said base layer;
    a top layer formed on said intermediate layer having electrically-conductive paths thereon a portion of said paths overlying said apertures in said intermediate layer;
    a continuous flexible membrane overlying said top layer and sealing said top layer and said plate and formed with a relatively thick projecting portion at each aperture in said intermediate layer;
    each of said projecting portions being connected to said membrane via a conical support surface;
    a rigid shield connected to said switch and formed with an array of throughgoing apertures aligned with and generally identical to those of the intermediate layer and having a rear face confronting the sealing portion of said membrane, the thick projecting portions of the membrane projecting forward through the apertures of the shield plate past the front face thereof;
    means for securing the shield plate to the membrane with the apertures aligned; and respective rigid caps fitted over the thickened portions, projeccting forward through the shield plate apertures.

2. A shielded push-button switch assembly comprising:
    a pressure-actuated switch matrix containing a base plate and multi-layer electrically-conductive, pressure-activated switch points formed on said base plate;
    said switch points being arrayed in regular rows and columns;
    a continuous flexible membrane having a lip formed at the periphery thereof and having formed thereon at each of the switch points, a relatively thick protruding button-like portion whereby the lip of the membrane seals the layers of the switch while allowing switch points to be depressed via said protruding portions;
    a rigid shield plate formed with an array of throughgoing apertures aligned with and generally identical to the locations of the relatively thick protruding button-like portions of said membrane and a lip portion; the projecting portions of the membrane projecting forward through the apertures of the shield plate past the front face thereof and the lip portion of the plate coacting with the lip of said membrane;
    means for securing the shield plate, the membrane, and the switch with the apertures of the shield plate aligned with the projecting portions of the membrane and the switch points of the switch; and
    respective rigid caps fitted over the thickened portions, projecting forward through the shield plate apertures, said relatively thick portions being mounted on said membrane via frusto-conical surfaces formed on said membrane whereby the force exerted by said frusto-conical surface urges said relatively thick portions away from said swich points.

3. A pressure-actuated switch comprising:
    a first thin, flat base layer having electrically-conductive paths formed formed thereon, said paths including points for electrical contact;
    an intermediate layer having a plurality of apertures therein, said apertures overlying said points of electrical contact;
    a third layer having electrically-conductive paths including a switch points formed thereon, said switch points overlying said apertures in said intermediate layer and said switch points in said base layer, said third layer further including a ribbon cable portion thereof formed integrally therewith, said ribbon cable portion including electrically-conductive paths formed thereon;

an electrical connector coupled to said ribbon cable and joining with said electrically-conductive paths thereon; said switch generating an electrical signal on contact of the switch points in said base layer and said third layer; and membrane means for sealing said base layer, said intermediate layer and said top layer, said membrane including means to urge said switch points into contact, said urging means including:

a plurality of thickened portions overlying respective ones of said switch points; said thickened portions being spaced from said switch points and from the surface of said membrane via frustro-conical supports; each of said frusto-conical supports creating a frusto-conical volume beneath said support; and, a plurality of air release channels connected between said supports so as to reduce the pressure of air beneath said supports;

a rigid shield connected to said switch and enclosing said membrane sealing means apertures on said intermediate layer; the thickened portion projecting forward through the apertures of the shield plate past the front face thereof;

push-button means consisting of a plurality of caps interfitting over said thickened portions;

the force required to depress said thickened portions being controlled by said frusto-conical supports whereby an initial higher force and subsequent lesser force is required.

4. A switch assembly comprising:

a pressure-actuated switch including a rigid base plate having a front face; a first flexible layer adhesively secured to said rigid base plate formed with an array of electrically-conductive paths thereon;

an intermediate layer formed on said last-mentioned layer having a plurality of apertures formed therethrough overlying portions of said electrically-conductive paths;

a flexible top layer formed on said intermediate layer having electrically-conductive paths thereon, portions of said paths overlying said apertures in said intermediate layer;

a continuous flexible membrane overlying said top layer including a lip portion overlying and sealing said switch, and formed at each of said last-named oerlying portions with a relatively thick projecting portion in front of the respective top layer overlying portion whereby the membrane seals the rigid base and said flexible layers while allowing said electrically-conductive paths in said top layer and said first flexible layer to contact each other;

said relatively thick portions being formed on said flexible membrane via a frusto-conical support for each member, the frusto-conical support urging said overlying thick portions away from said pressure-actuated switch;

a rigid shiled plate formed with an array of throughgoing apertures aligned with those of said intermediate layer, a rear face confronting said membrane, and a side portion overfitting said lip portion, the thick projecting portions of said membrane projecting forward through the apertures of the shield plate past the front face thereof;

means for securing the shield plate in front of the membrane with the apertures aligned; and respective rigid caps fitted over the thickened portions, projecting forward through the shield-plate apertures.

5. The switch assembly of claim 4 wherein said frustoconical support portions are connected to each other via channels formed in said membrane, said channels providing a path for venting air pressure to other regions connected by said channels on depression of said portions.

6. The switch assembly of claim 4 wherein the apertures in said intermediate layer are connected to each other via respective channels so as to preclude air pressure from building up in the space between and overlying electrically-conductive materials, by venting said pressure to other regions connected by said channels.

7. The switch assembly of claim 4 wherein the shield-plate is made of steel.

8. The switch assembly of claim 4 wherein the membrane comprises an elastomer.

9. The switch assembly of claim 4 wherein the shield-plate apertures and caps are complementarily polygonal.

10. The switch assembly of claim 4 wherein the shield-plate apertures and caps are generally square.

11. A shielded push-button switch assembly comprising:

a continuous flexible membrane having a plurality of relatively thick protruding button-like portions formed thereon, said thick portions supported on said membrane via frusto-conical support portions coupling said thick portions to said membrane;

a rigid shield plate formed with an array of throughgoing apertures aligned with said relatively thick portions, said portions of the membrane projecting forward through the apertures of the shield plate past the front face thereof;

respective rigid caps fitted over the projecting portions of said membrane;

a pressure-actuated switch having contact points located beneath said frusto-conical support portions;

said switch being supported and sealed by said membrane;

said pressure-actuated switch including a solid support layer;

a base layer of flexible material formed on said support layer, said base layer having electrically-conductive portions formed thereon;

an intermediate spacing layer formed on said base layer, said spacing layer having apertures therein overlying a portion of said electrically-conductive portions of said base layer, said apertures being aligned with the thickened portions of said membrane;

a top layer of flexible material hacing electrically-conductive portions thereon, said electrically-conductive portions overlying said intermediate layer and said apertures; and said membrane and said shield plate enclosing and sealing said switch.

12. The apparatus of claim 11 wherein said membrane has an edge portion formed thereon, said edge portion surrounding said pressure-actuated switch to seal and support ssame.

13. The apparatus of claim 11 wherein said frustroconical portions are each connected to the other via channels formed in said membrane so that air pressure that may build up beneath one or more of said frustroconical support portions will not inhibit operation of the switch.

14. The apparatus of claim 11 wherein apertures of said intermediate layer are connected to each other via a channel which channel provides a path for release of air pressure so that operation of the switch will not be inhibited.

15. A switch assembly comprising,
a pressure actuated actuated switch including a solid support layer;
a base layer of flexible material formed on said support layer, said base layer having electrically-conductive portions formed thereon;
an intermediate spacing layer formed on said base layer, said spacing layer having apertures therein overlying a portion of said electrically-conductive portions of said base layer, said apertures being aligned with the thickened portions of ssaid membrane;
a top layer of flexible material having electrically-conductive portions thereon, said electrically-conductive portions overlying said intermediate layer and said apertures;
a continuous flexible membrane overlying said switch and formed ast each of the apertures with a relatively thick projecting portion in front of the respective apertures whereby the membrane seals the layers while allowing same to be depressed via the thick portions; and
means urging the overlying portions forward from the front face;
a shield assembly comprising:
a rigid shield plate formed with an array of through-going apertures aligned with and generally identical to those of said intermediate layer and having a rear face confronting the front face of said membrane, the thick projecting portions of the membrane projecting forward through the apertures of the shield plate past the front face thereof;
means for securing the shield plate in front of the membrane with the apertures aligned; and
respective rigid caps fitted over the thickened portions, projecting forward through the shield-plate apertures, and each having an outwardly projecting flange extending generally parallel to and lying between the plates and of greater size than the respective shield-plate aperture, the means urging the respective flanges forward against the rear face of the shield plate.

* * * * *